July 4, 1961 C. O. MERCHANT 2,990,940
INTEGRAL TABLE STRAIGHT LINE INDEX
Filed May 19, 1959 4 Sheets-Sheet 1

INVENTOR.
CHESTER O. MERCHANT
BY
Charles L. Lovercheck
ATTORNEY

July 4, 1961
C. O. MERCHANT
2,990,940
INTEGRAL TABLE STRAIGHT LINE INDEX
Filed May 19, 1959
4 Sheets-Sheet 2
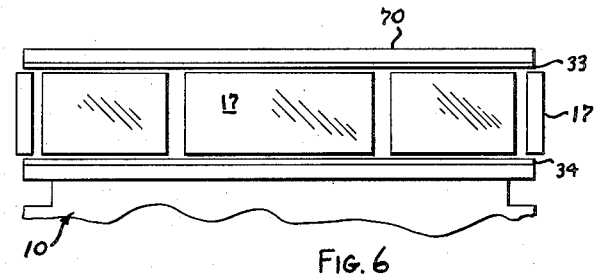
FIG. 6
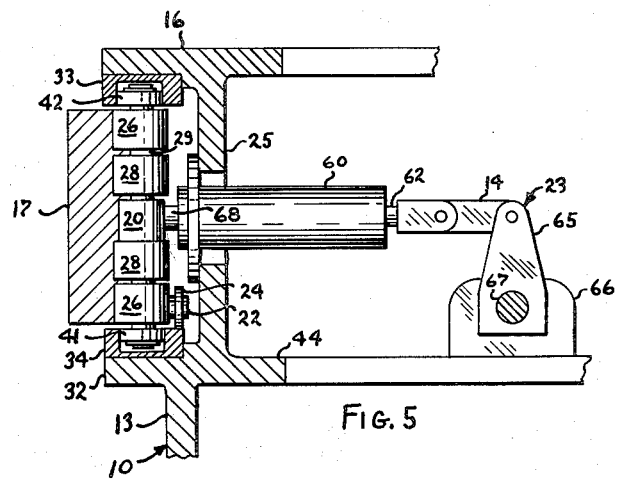
FIG. 5
FIG. 7
INVENTOR.
CHESTER O. MERCHANT
BY
*Charles L. Lovenheck*
ATTORNEY

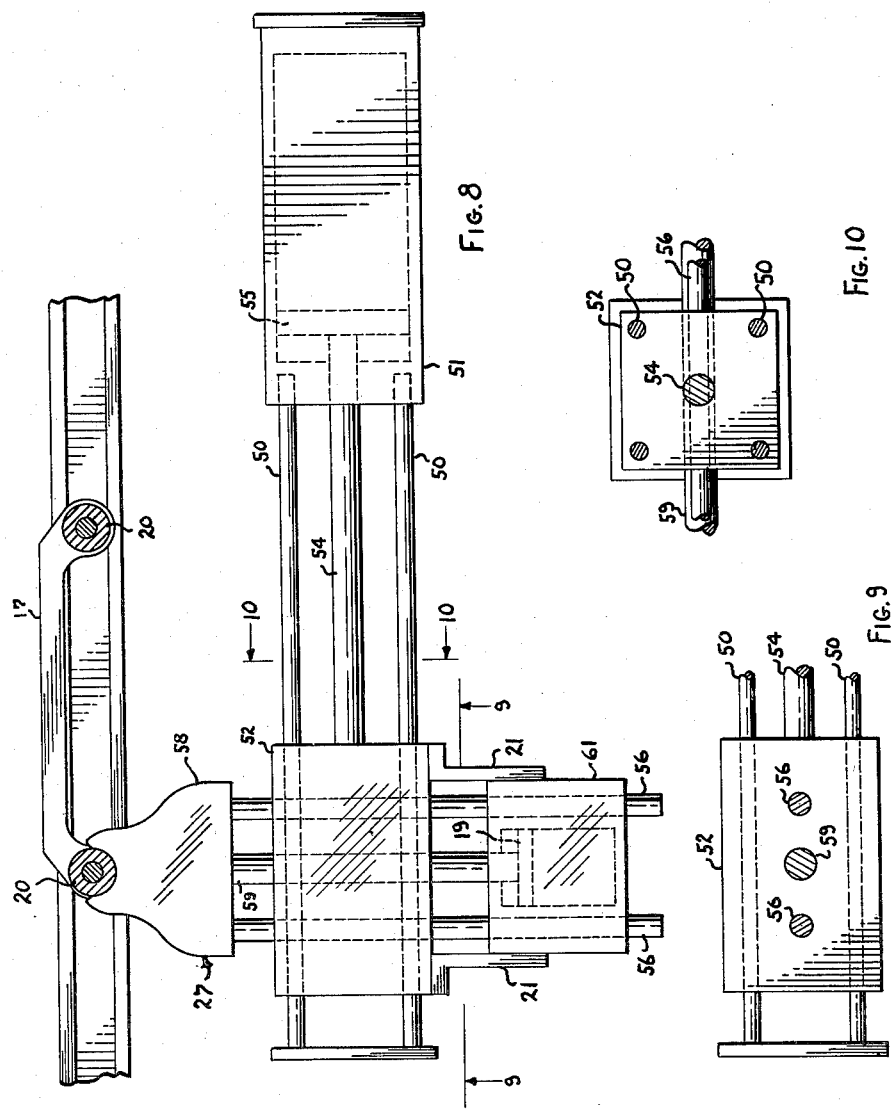

United States Patent Office 2,990,940
Patented July 4, 1961

2,990,940
INTEGRAL TABLE STRAIGHT LINE INDEX
Chester O. Merchant, Erie, Pa., assignor to Swanson-Erie Corporation, Erie, Pa., a corporation of Pennsylvania
Filed May 19, 1959, Ser. No. 814,329
3 Claims. (Cl. 198—137)

This invention relates to indexing machines of the type commonly used for assembling articles of manufacture and, more particularly, to indexing machines wherein certain parts of the tools are moved generally in a straight line relative to other parts.

This application is a continuation in part of application, Serial No. 568,488, filed February 29, 1956, which issued as Patent No. 2,887,209.

The prior application discloses an indexing machine wherein the articles to be assembled are carried on a chain made up of a plurality of articulated plates supported thereon, the chain being supported on sprockets. Some of the sprockets are carried by a chain tightener. The present invention contemplates a table made of integral cast or fabricated construction which carries the chain in a channel track and which does not require sprockets to carry the chain or guide it. The track which carries the chain around the table is made with precision relative to the length of the chain and, therefore, no tightening is necessary. Therefore, no sprockets and other movable articulated members are necessary.

It is, accordingly, an object of this invention to provide an improved straight line indexing machine.

Another object of the invention is to provide an improved indexing machine which is simple in construction, economical to manufacture, and simple and efficient in operation.

A further object of the invention is to provide an indexing machine having a chain for carrying articles of manufacture wherein the chain is carried in a channel like track around the table.

A still further object of the invention is to provide an improved indexing mechanism in combination with an indexing table.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 5 is a cross sectional view similar to FIG. 3 showing a chain locking device;

FIG. 6 is an end view of the machine with parts broken away;

FIG. 7 is an enlarged side view of the chain;

FIG. 8 is a top view of the indexing device;

FIG. 9 is a view taken on line 9—9 of FIG. 8;

FIG. 10 is a view taken on line 10—10 of FIG. 8; and

Figure 1:
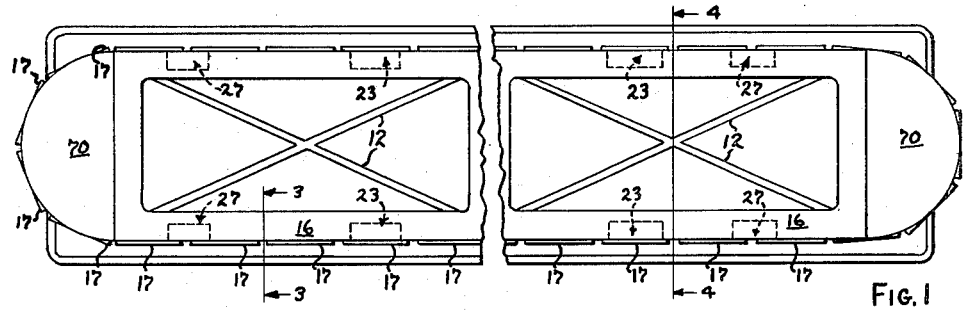
FIG. 1 is a top view of an indexing machine according to the invention.
Figure 2:
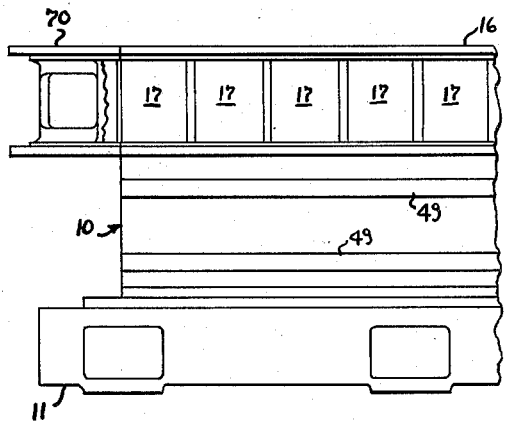
FIG. 2 is a partial side view of the machine shown in FIG. 1 having one end broken away and the chain shown broken away at one end thereof.
Figure 3:
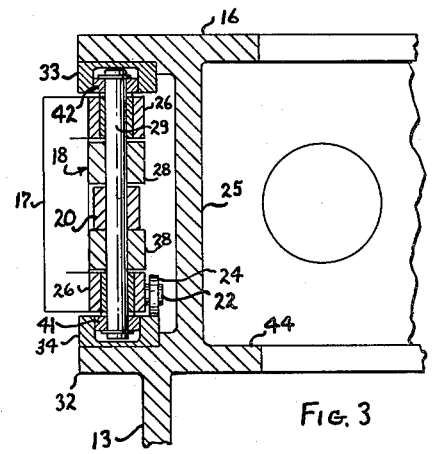
FIG. 3 is a partial cross sectional view taken on line 3—3 of FIG. 1.
Figure 4:
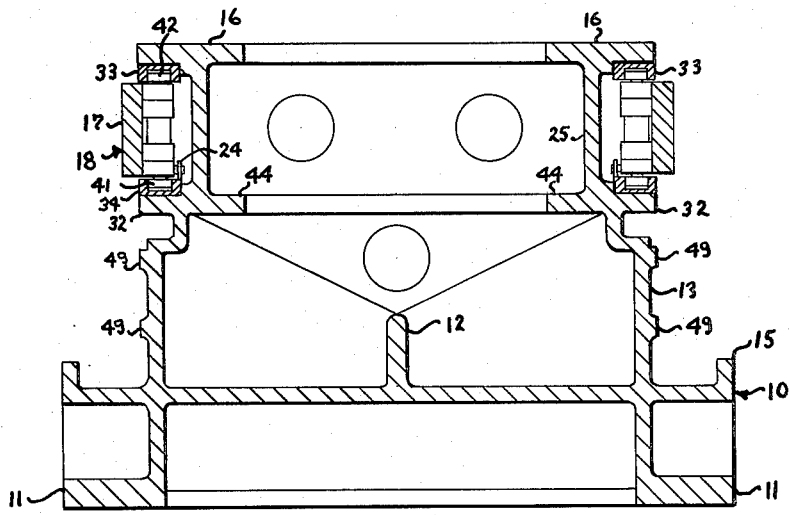
FIG. 4 is a cross sectional view taken on line 4—4 of FIG. 1.

Now with more particular reference to the drawings, the machine is shown having an integrally cast frame 10.

The frame 10 has vertically disposed sides 13 laterally connected by horizontally disposed webs 12. The webs 12 intersect at the center and diverge outwardly. The outer ends of the webs 12 are integrally attached to the sides 13 of the frame 10.

An outwardly extending base 11 is integrally attached to the sides 13. Outwardly and upwardly directed flanges 15 are integrally attached to the sides 13 in alignment with the webs 12.

Spaced, raised longitudinally extending ribs 49 are formed on the sides 13 along the outside and spaced above a flange 16. The outer surfaces of the ribs 49 are machined to an accurate finish for supporting tools or fixtures slightly above the ribs 49. The side 13 bends inwardly and then upwardly and is integrally attached to a flange 32 and an inwardly directed flange 44. The side 13 extends vertically at 25 between the flange 44 and the top flange 16.

The lower side of the flange 16 and the upper opposed side of the flange 32 each have a flat surface terminating adjacent the side 13 in a shoulder. Lower channels 34 are supported on the upper surface of the flange 32 and an upper channel 33 is supported on the lower surface of the flange 16.

The frame 10 is rectangular and has a semi-circular track section 70 welded on each end of the flange 16. The track section 17 is a continuation of the channels 33 and 34. The channels 33 and 34 extend around the entire periphery of the machine and form continuous guiding tracks for a chain 18 of fixed precision length plates 17. The chain 18 is made up of the spaced side plates 17, each of which has a flat, outwardly facing surface thereon for supporting fixtures, tools, or articles of manufacture to be processed.

Spaced outer integral ears 26 are integrally attached to the plates 17, one at each outer edge at one end thereof, and inwardly spaced, integrally attached ears 28 are attached to the end of each plate 17 opposite the ears 26. The ears 26 lie over the ears 28. Aligned holes are formed through the ears 26 and 28 at adjacent ends of each plate 17. Pins 29 extend through these holes and connect the plates 17. Rollers 20 are supported on the pins 29 between the inner ears 28.

Rollers 41 and 42 are supported on the upper and lower ends, respectively, of the pins 29. The rollers 41 and 42 are held on the pins 29 by means of snap rings disposed in grooves at the opposite ends thereof as shown.

The lower portions of the plates 17 have axles 22 which support rollers 24. The rollers 24 ride on the upper surface of the inner upwardly extending leg of the channel 34 and thereby regulate the vertical movement of the chain 18. Since the channels 33 and 34 are of precision construction, the usual chain tightener or sprockets are not required. The chain 18 is guided by the rollers 41 and 42 in the channels 33 and 34. The rollers 24 carry the chain 18 in a precision path.

In order to lock the chain 18 positively in position the intervals of time that the chain 18 moves, a locking mechanism 23 shown in FIG. 5 is provided. The locking mechanism 23 has a piston cylinder 60 which is fixed to the portion 25 of the side 13. The piston cylinder 60 has a piston therein with a piston rod 62. The piston rod 62 has an inner end attached to a link 14 which in turn is connected to a crank arm 65. The crank arm 65 is attached to a crank rod 67 in turn bearing in brackets 66. The rod 67 extends through the brackets 66 parallel to the chain 18 and is connected by crank arms similar to the arm 65 and to other rods similar to the piston rod 62. Thus, as the crank arm 65 operates, the other rods are operated by the rod 67 and all of the rods are operated from one cylinder.

An outer end 68 of the piston rod 62 is conical in shape and is received in conical shaped openings 63 in the plates 17. Therefore, when the piston rod 62 is forced outwardly in the position shown, the plate 17 will be positively locked in position. When the piston rod 62 is retracted, the chain 18 can be advanced by the advancing mechanism.

An advancing mechanism 27 to advance the chain 18 is shown in FIGS. 8, 9, and 10. In these figures, a support 52 is fixed to the machine frame 10 and guide rods 50 are slidably received in bores in the support 52. A cylinder 51 is supported on the machine frame 10 and carries the guide rods 50 which are received in the support 52. A piston 55 is received in the cylinder 51 and connected by means of a piston rod 54 to the support 52. Therefore, when the piston 55 is moved from one side to the other of the cylinder 51, the support 52 will be moved toward and away from the cylinder 51 relative to the machine frame 10 and will carry with it a fork 58.

The fork 58 engages the rollers 20 when in the extended position shown and is released from the rollers 20 when in the retracted position. The fork 58 is carried by guide rods 56 which are in turn slidably supported in the support 52 and a cylinder 61. A piston 19 is received in the bore in the cylinder 61 and the cylinder 61 is attached to the support 52 by means of angle supports 21. The guide rods 56 are slidably received in both the support 52 and in the bores in the cylinder 61. A piston rod 59 it attached to the piston 19 and to the fork 58. Therefore, when the piston 19 moves inwardly and outwardly in the cylinder 61, the guide rods 56 slide in the cylinder 61 and, also, in the support 52 and the fork 58 is retracted and extended to engage the rollers 20 and to be released from them. Therefore, when the fork 58 is in the position shown and the piston 55 actuated, the chain 18 will be advanced and when the fork 58 is moved away from the rollers 20, it may be moved for another index. While the piston 55 is at rest, the end 68 will be thrust forward into the openings 63 to hold the chain 18 positively in position so that articles attached thereto will be positioned accurately.

Figure 11:
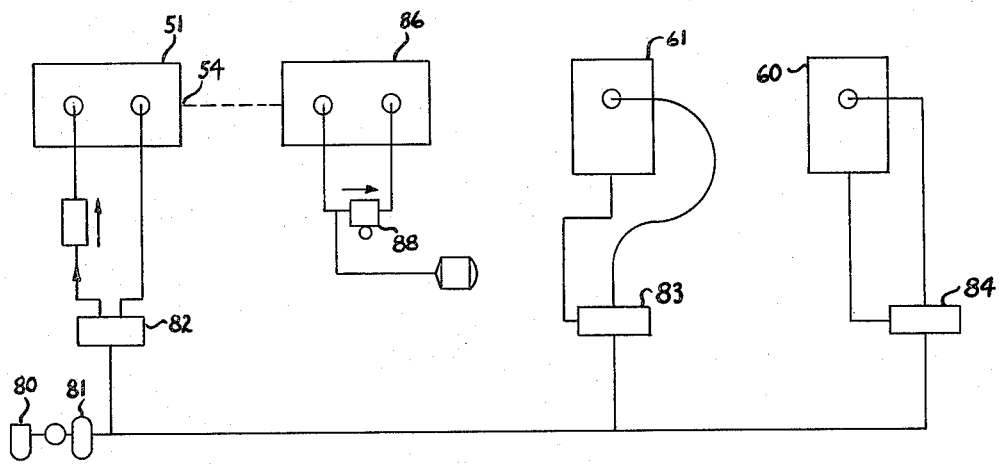
FIG. 11 is a control circuit for actuating the machine.

In FIG. 11, a control circuit for the lock mechanism and index mechanism is shown. Air may be the control medium used. The air may be filtered in a filter 89 and lubricated by a lubricator 81.

Air thus lubricated is supplied to four-way valves 82, 83, and 84. The lock cylinder 61 is supplied air when the valve 84 is actuated. The valve 83 actuates the cylinder 61. The valve 82 is a four-way valve which supplies air to one side of the piston 55 to advance it and to the other side thereof to retract it.

The valves 82, 83, and 84 may be actuated by timing mechanisms if desired. A dash pot 86 is connected to the piston rod 54 by a rod and a restrictor 88 allows the piston 55 to move rapidly in one direction but to move slowly in the other direction by limiting the flow of fluid from one side of the piston in the dash pot 86 to the other in one direction.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An indexing machine comprising an integrally cast frame having a base, upwardly extending sides integrally attached to said base and extending upwardly therefrom, horizontally extending ribs on the outer sides of said sides, said ribs having an outwardly directed accurately machined surface thereon for supporting tools and fixtures, an outwardly directed flange integrally connected to each of said sides, an inwardly directed first flange integrally attached to each said side and to said outwardly directed flange, a second upwardly directed side integrally attached to said first flange and extending upwardly therefrom, a second outwardly directed flange integrally attached to said second side and forming a top flange for said frame, an upwardly directed channel supported on said first outwardly directed flange, a downwardly directed channel supported above said upwardly directed channel supported on said second flange, a precision chain having an outwardly directed surface disposed in a vertical plane, said chain having a plurality of spaced links connected together, said links being connected together by spaced ears integrally connected to one end of each said link, second ears on the other end of each said link, said ears having bores aligned with each other, a pin extending through said bores, said pin extending beyond the outer edges of said spaced ears and having rollers thereon, said rollers being received in said channels, and a laterally disposed roller attached to each said link, said laterally disposed rollers being carried by the upwardly directed leg of said upwardly directed channel.

2. The machine recited in claim 1 wherein said channels extend continuously around said table and said table has opposite parallel disposed sides.

3. An indexing machine comprising an integrally cast frame having a base, a chain, upwardly extending sides integrally attached to said base and extending upwardly therefrom, horizontally extending ribs on the outer sides of said sides, said ribs having an outwardly directed accurately machined surface thereon for supporting tools and fixtures, an outwardly directed flange integrally connected to each of said sides, an inwardly directed first flange integrally attached to each said side and to said outwardly directed flange, a second upwardly directed side integrally attached to said first flange and extending upwardly therefrom, a second outwardly directed flange integrally attached to said second side and forming a top flange for said frame, said flanges extending continuously around said frame, an upwardly facing channel supported on the lower of said flanges, spaced pins each having a roller on the upper end thereof received in said upwardly facing channel and a roller on the lower end thereof received in a downwardly facing channel supported on the lower of said flanges, plate members disposed in vertical planes and attached to said pins, means connecting said plates together, means on said frame to support tools above said plates, and means to index said plates around said frame.

References Cited in the file of this patent
UNITED STATES PATENTS
2,787,366     Sykokis _____ Apr. 2, 1957